United States Patent Office 3,402,059
Patented Sept. 17, 1968

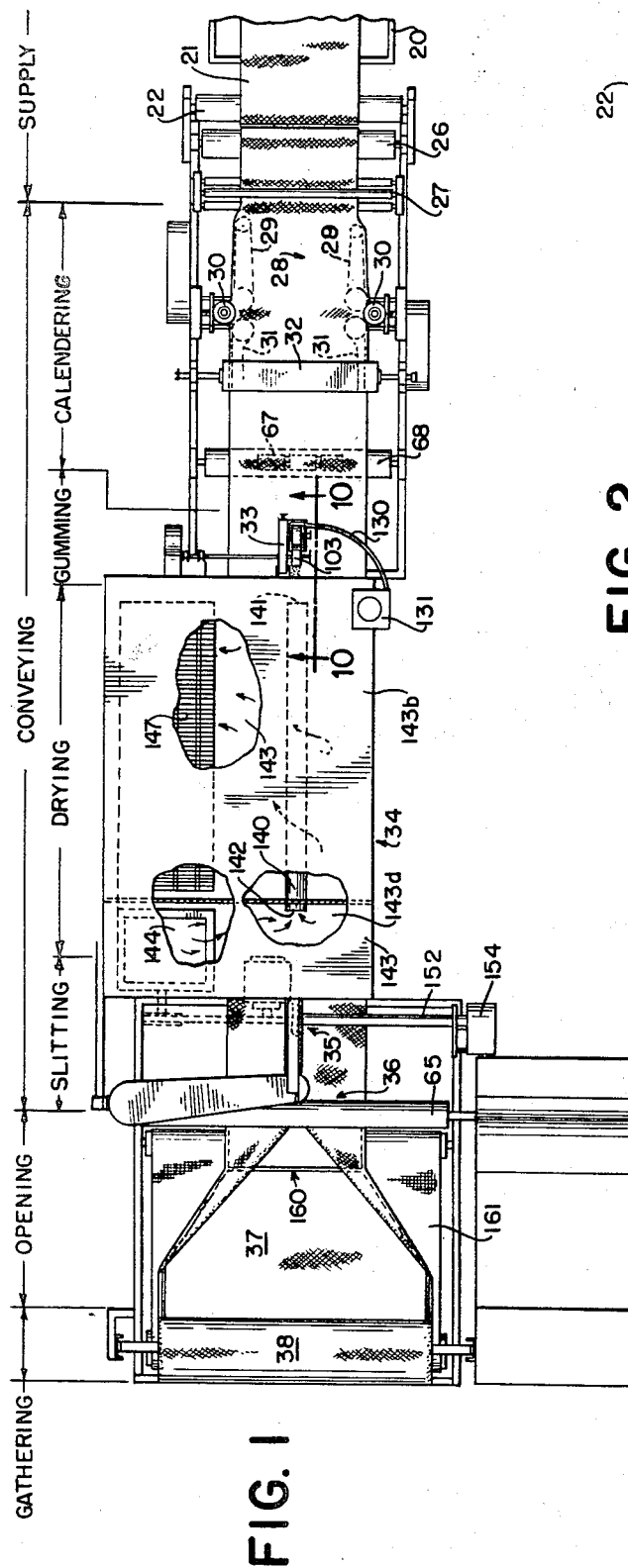

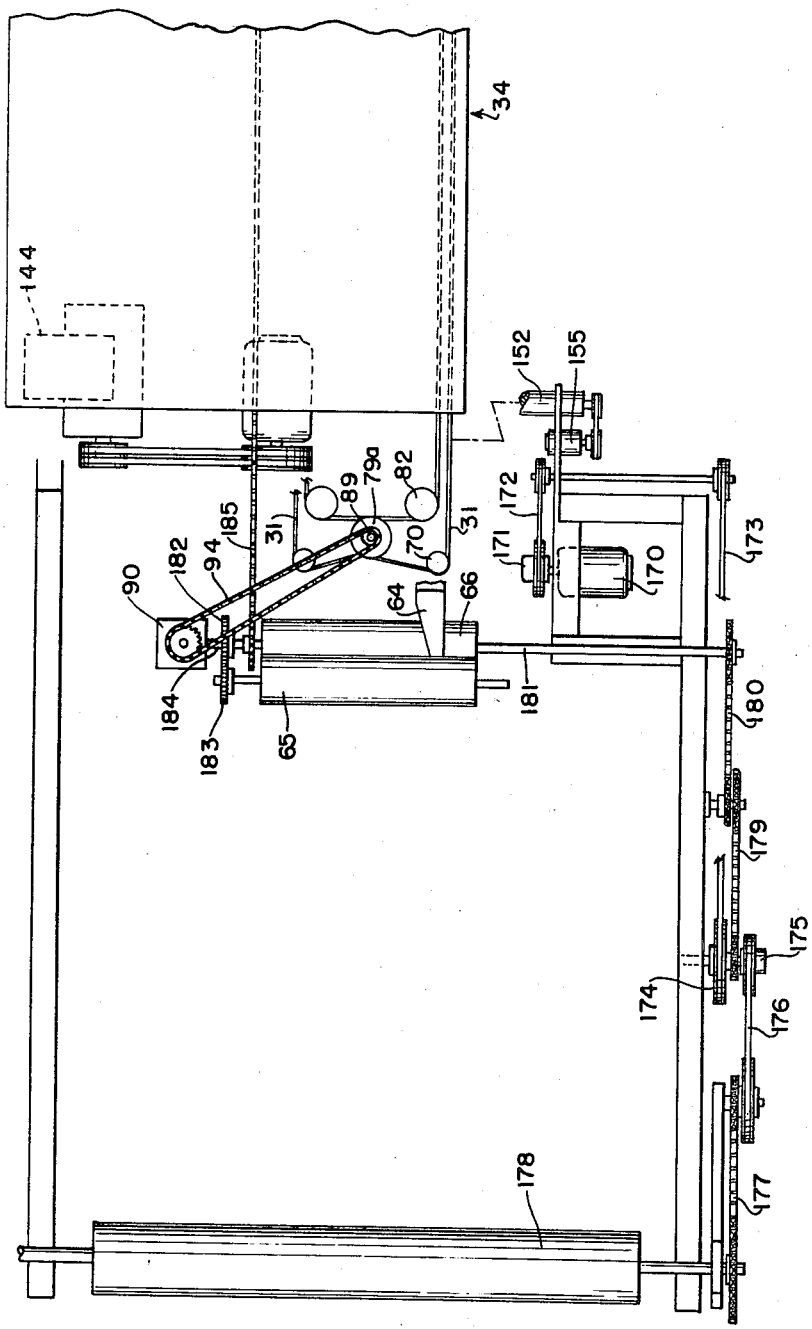

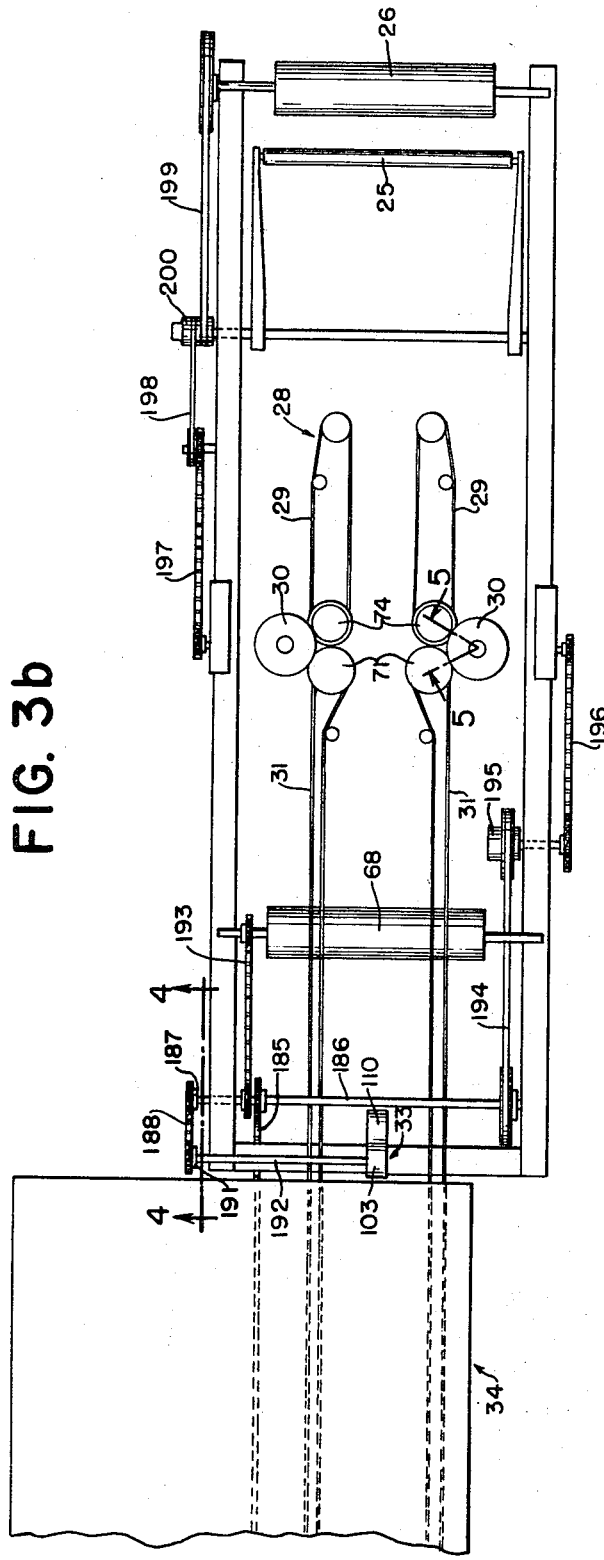
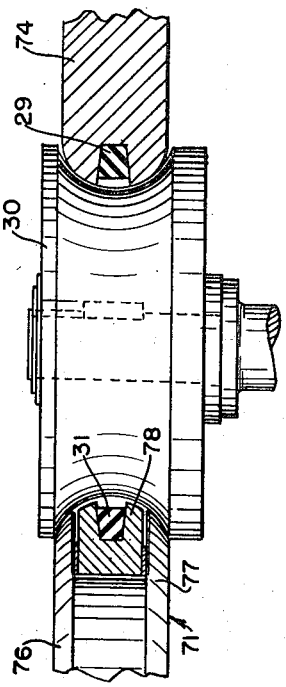
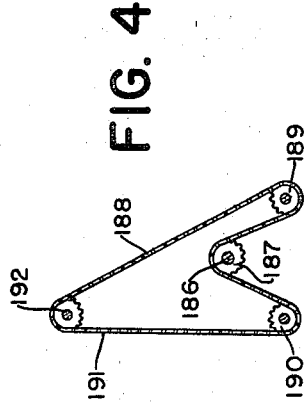
FIG. 3b
FIG. 5
FIG. 4
INVENTORS
FRANK CATALLO
SAMUEL COHN
BY
Mandeville & Schweitzer
ATTORNEYS

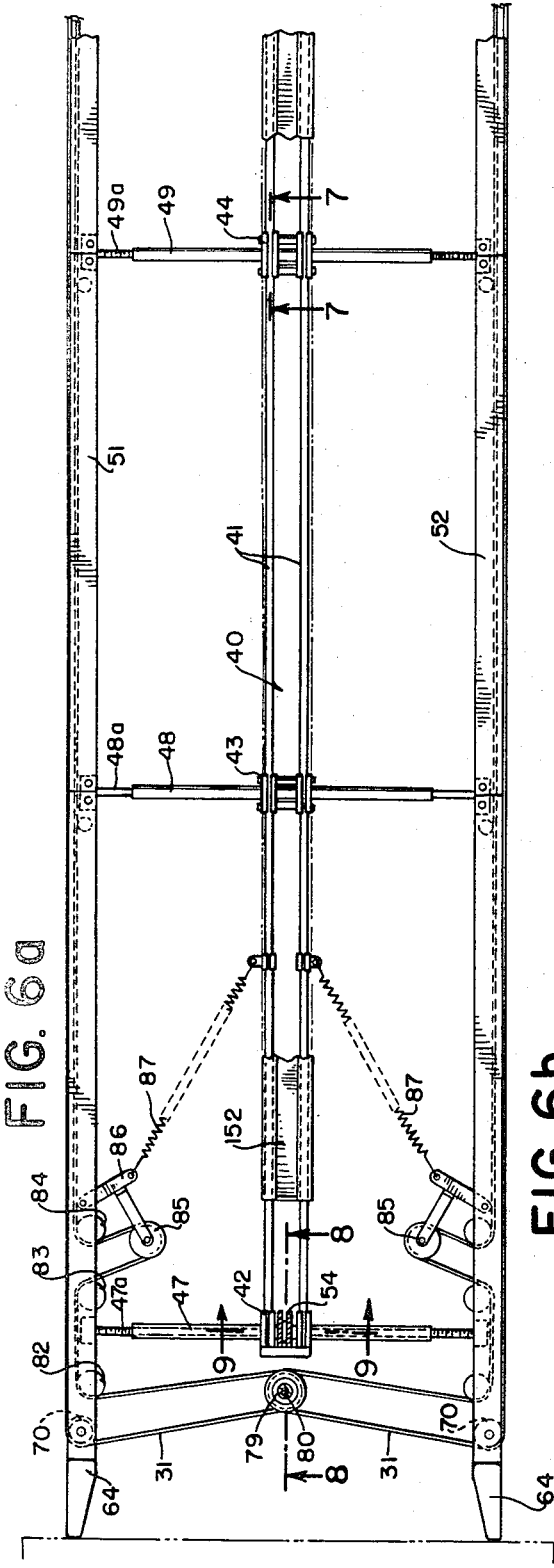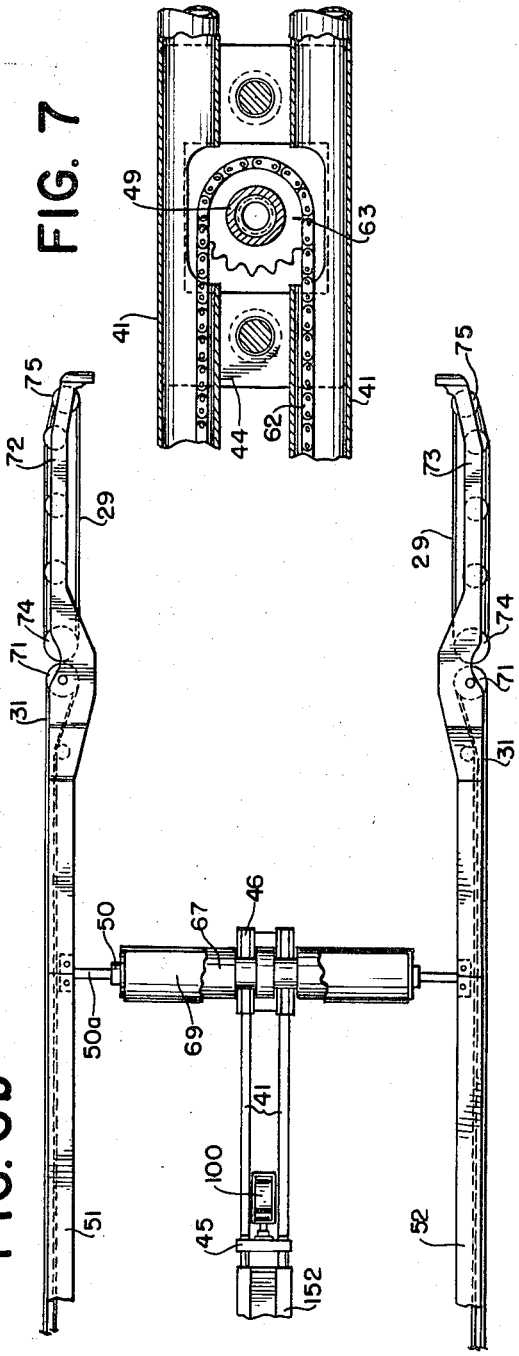

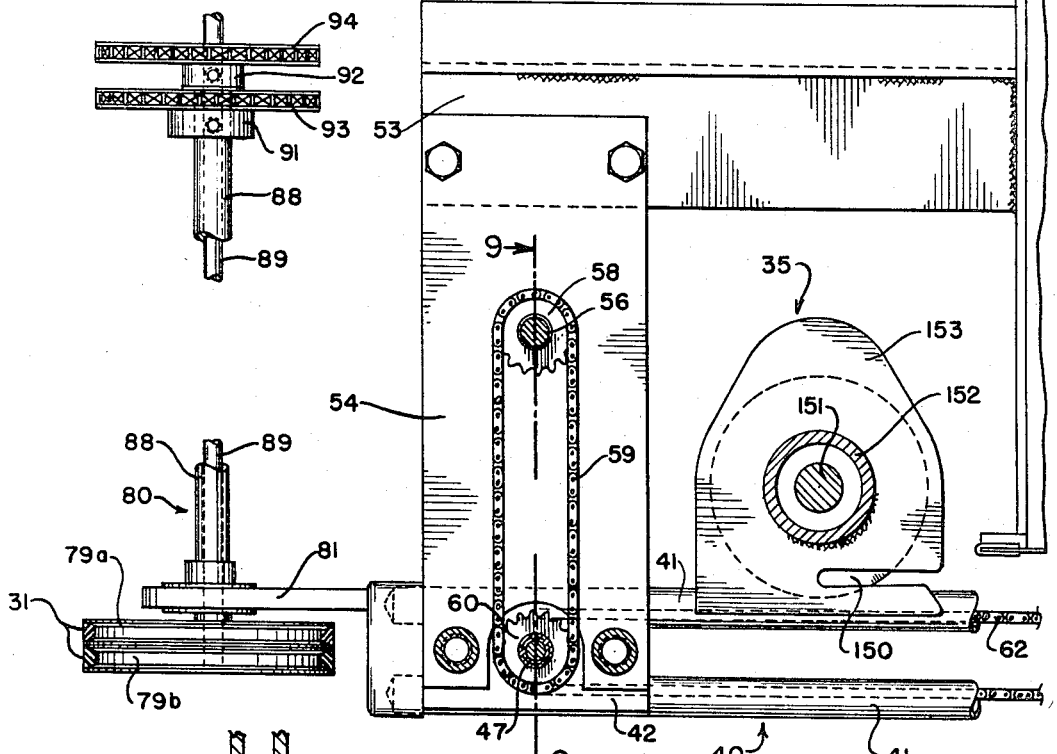
FIG. 8
FIG. 9
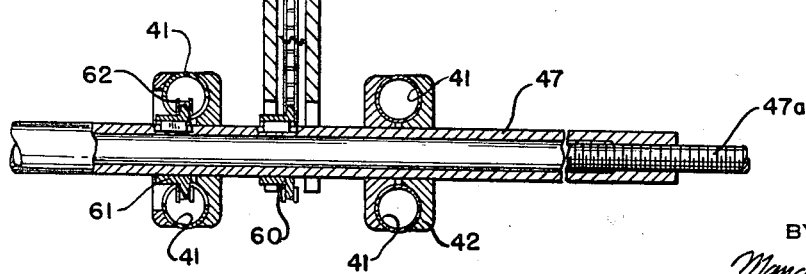

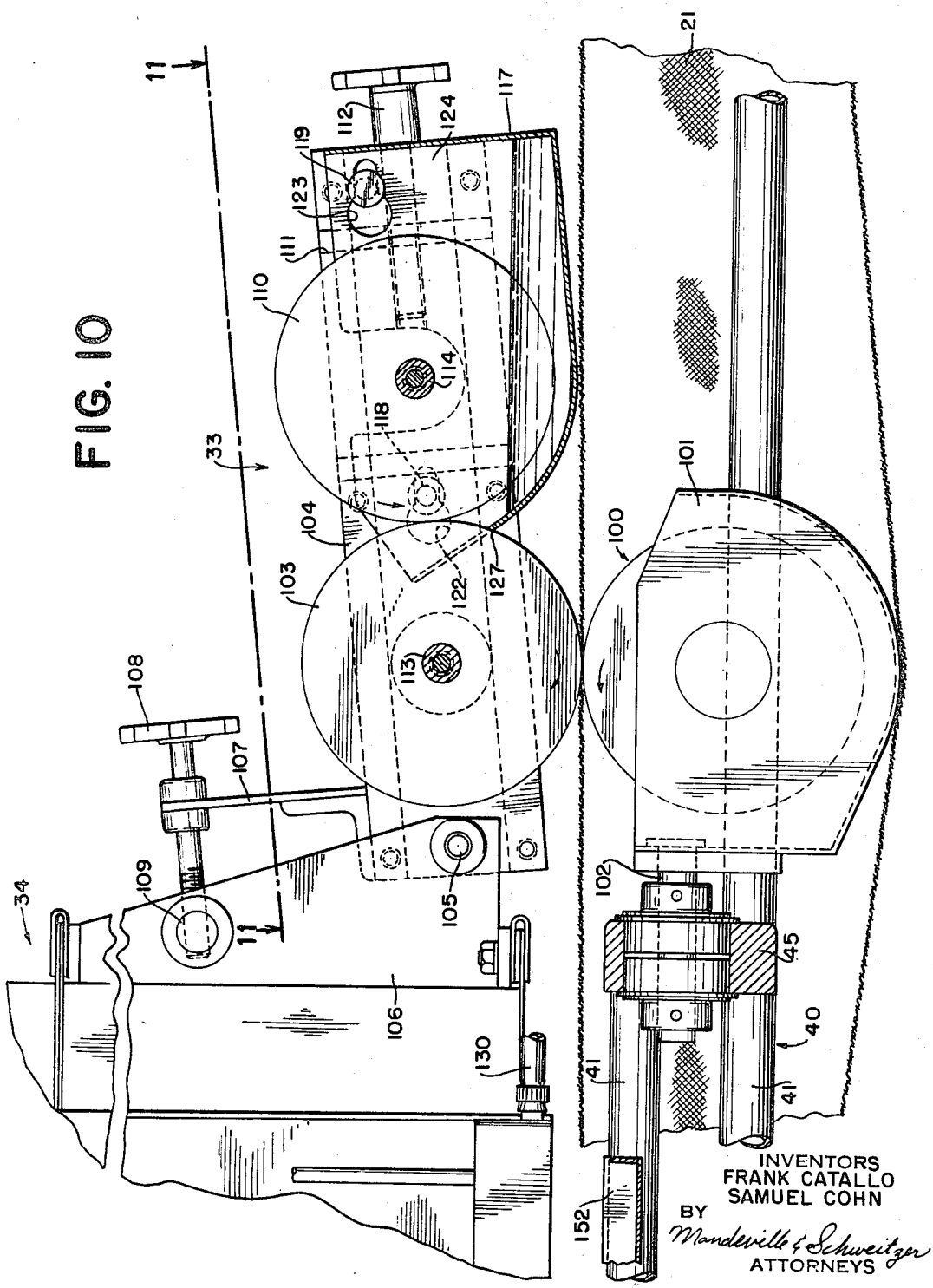

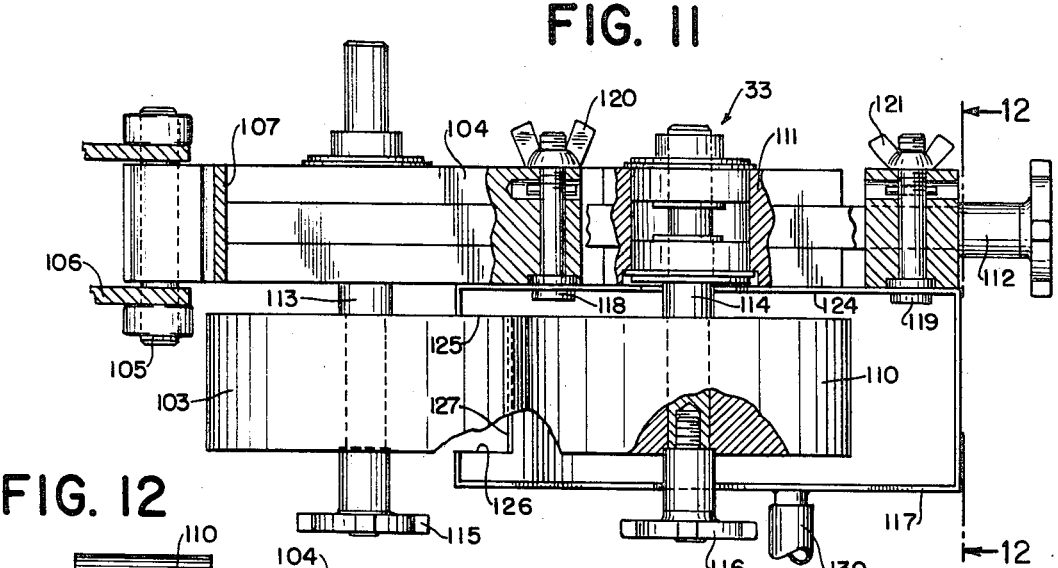
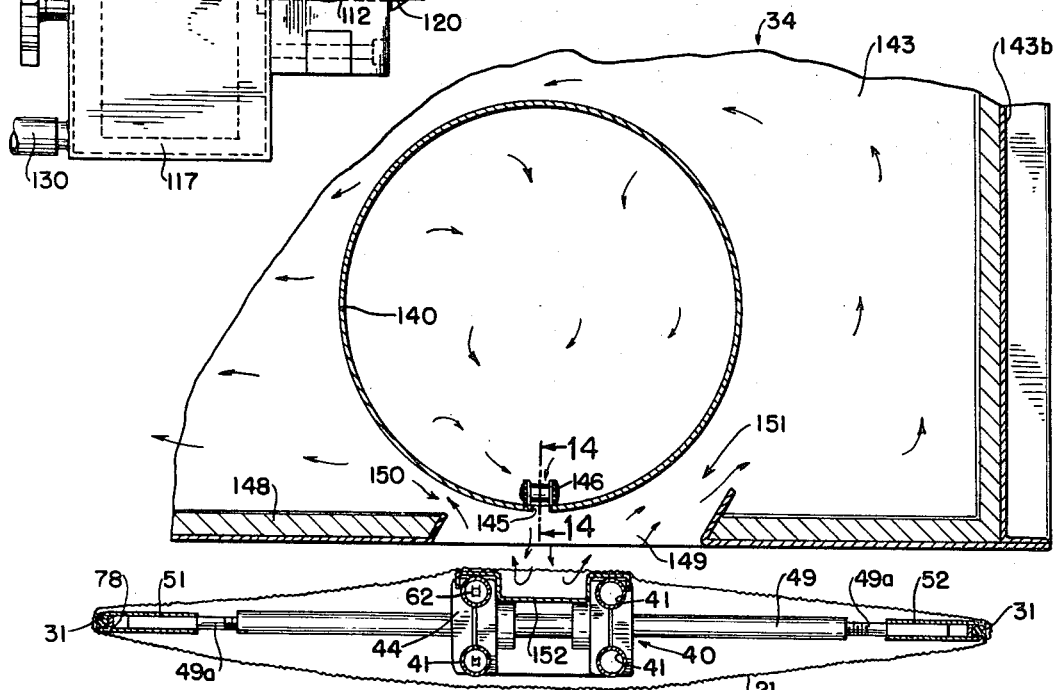

3,402,059
METHOD AND APPARATUS FOR APPLYING ADHESIVE AND SLITTING TUBULAR FABRIC
Samuel Cohn, deceased, late of New York, N.Y., by Eugene Cohn, Great Neck, N.Y., and Jean Rothenberg, Richmond, Va., executors, and Frank Catallo, Elmont, N.Y., assignors to Samcoe Holding Corporation, Woodside, N.Y., a corporation of New York
Continuation-in-part of application Ser. No. 229,861, Oct. 11, 1962. This application Jan. 5, 1967, Ser. No. 614,379
15 Claims. (Cl. 117—4)

ABSTRACT OF THE DISCLOSURE

The invention relates to new procedures and facilities for gumming and slitting tubular knitted fabric in a continuous and integrated manner, to form geometrically uniform, open width, knitted fabric.

Cross reference to related application

This application is a continuation-in-part of our copending application Ser. No. 229,861, filed Oct. 11, 1962, now abandoned.

Background

In the knit goods field, it is conventional to manufacture knitted fabrics on circular knitting machines, the production of such machines being a continuous tube of knitted fabric. Frequently, it is possible to process and utilize the fabric in tubular form. However, for a large and increasing variety of end uses, such as coated or laminated materials, printed fabrics, etc., it is necessary or desirable to handle and utilize the knit fabric in flat, open width form which necessitates, at some stage in the processing of the fabric, the slitting of the fabric tube and the subsequent opening of the slit tube to enable the fabric to be presented in flat form.

Since knitted fabric, as distinguished from most woven fabrics, for example, is easily distortable in any direction and is usually subject to internal tensions in the stitches and threads, the slitting of a tube of knit of knit fabric is often accompanied by a severe curling of the slit edges, which makes the subsequent opening and gathering of the slit material difficult and also complicates the necessary subsequent handling and processing of the material. For this reason, it has been conventional practice in the knit goods industry to apply a strip of gumming composition to the knit fabric before slitting. After drying or curing of the gumming compostion, the edges of the fabric are relatively stiff, and the knit fabric tube can be slit along the center of the gummed strip. The cured or dried gumming composition serves to maintain the integrity of the slit edges and to prevent excessive curling and distortion thereof.

While the foregoing practice is conventional in the most general sense, its actual performance on an industrial or commercial basis has been characterized by inefficiency, excessive expense and a substantial inability to achieve consistently controllable final results. Largely, this has been due to the fact that the several operations involved in converting the tubular knitted fabric from tubular form to flat, open width, gathered form have not, in the past, included the critical steps of geometrically orienting the fabric and maintaining its desired geometry throughout. This has been aggravated by the fact that the several operations involved often were required to be carried out separately and often at different times and places, resulting in a critical lack of continuity and control. The several handlings of the material have made very remote and difficult indeed the desired objective of achieving uniform and consistent performance as regards the dimensions and other geometric characteristics of the gathered, open width material.

Summary of the invention

In accordance with the invention, a novel and improved apparatus and procedure are provided whereby the knit material, in its initial, tubular form, may be processed continuously and in direct sequence of operations in such manner that the tubular knitted fabric is converted to open width form and gathered, all while maintaining complete and continuous control of the fabric geometry, enabling the greatest practicable uniformity to be realized in the "finished" material and enabling significant economies to be realized in terms of production expense, equipment requirements and factory space utilization. In this respect, the invention is directed to both broad and specific aspects of apparatus and procedure for enabling the gumming, slitting, opening and gathering of knitted fabric to be carried out in a continuous, sustained sequence, with the fabric being maintained at all times under continuous, substantial control as to its dimensions and conditions.

One of the specific aspects of the invention resides in the performance of a plurality of predetermined steps, including specifically the setting of the fabric to predetermined, uniform width and geometry, the steaming of the spread fabric, the application of a predetermined strip of gumming composition, the drying and/or curing of the gumming composition, and the slitting of the fabric tube along the strip of dried composition, all while maintaining the fabric in continuous, sustained motion under predetermined, uniform and positive conditions as to fabric geometry.

One of the specific features of the invention, which contributes significantly to the overall performance, is an improved facility for spreading the tubular fabric to predetermined width and conveying the spread fabric through a predetermined elongated course, while maintaining the fabric under positive control, free of lengthwise tension and drag, such that the desired sepuence of operations may be carried out while the fabric is maintained in a desired, predetermined geometrical condition. Of particular significance, the process and apparatus of the invention enable the cross lines of the highly distortable fabric to be controllably straightened or maintained straight, so that the slit and opened fabric is of uniform appearance. This is particularly important where the fabric is to be laminated with a plastic web, for example, where the cross lines of the fabric would become more or less of permanent configuration and may be readily visible in the laminated product.

Another specific aspect of the invention resides in the provision of a novel and significantly improved facility for drying and/or curing an applied strip of gumming composition while the tubular fabric is being conveyed and within a relatively short period of time, such that continuous drying of the gumming composition may be carried out on an apparatus of reasonable size operating continuously at a practical, high rate of fabric advancement. Specifically, for installations in which the gumming composition is a water- or solvent-based composition, the improved drying facility includes means for directing drying air generally vertically downward upon an extended longitudinal strip of the fabric inclusive of the strip of gumming composition, and thereafter diverting the air stream upwardly for collection and recirculation. The arrangement of the invention introduces particularly high efficiencies into the drying operation and enables the operation to be carried out at the highest practicable speed relative to the size of the equipment utilized and the linear rate of travel of the material during the drying procedure. Where thermoplastic gumming compositions are employed, the dryer section may, of course, be omitted.

One of the broader aspects of the invention resides in the provision of a novel combined arrangement of power driven internal conveyor systems for orienting and advancing a fabric tube throughout an elongated course of travel under uniform, predetermined conditions free of tension and edge drag, facilities for slitting the fabric tube while the tube is maintained in the desired uniform condition, means for opening the slit tube to flat form, and provisions for isolating the forces acting on the fabric during the opening stage, from the preceding stages of the procedure, including specifically the sliting stage. The arrangement is such that the highest practicable uniformity is achieved during the slitting operation, enabling the subsequent opening operation to be carried out accurately and uniformly, which in turn enables the open width fabric to be gathered in roll or folded form with accurately registered side edges. Moreover, processing of the fabric in an integrated, continuous manner, in accordance with the invention, results in very significant savings in fabric since the fabric sections may be sewed together end-to-end, to avoid having to cut off and discard distorted end sections. Reduced handling of the fabric also saves substantial time and labor and avoids soilage.

Perhaps the most significant aspect of the invention resides in the fact that the procedure of converting tubular knit fabric to edge-gummed, gathered, open width material may, for the first time, be carried out in a continuous, sustained sequence of operations, with the fabric being first geometrically oriented and then maintained positively under predetermined, uniform conditions as to fabric geometry, tensions, etc., throughout an extended, critical series of operations, and with the fabric being maintained under complete and positive geometric control from beginning to end. This advantageous and useful result is brought about by a novel combination arrangement of heretofore independent and/or loosely controlled processing stages and by specific improvements in the various stages themselves which contribute significantly to the combination by enabling the various processing stages to be associated in a combination structure of practical proportions and of commercial utility.

The "geometry" of the fabric refers not only to its principal dimensions of length and width, but also to the configuration of its cross lines of knitted loops. Maintenance of uniform length and width dimensions is a difficult matter in itself, but the provision of straight cross lines in the opened fabric can be particularly troublesome. In accordance with the present invention, overall fabric geometry is controlled and made uniform and desirable by a combination of steps including controllably feeding the fabric edges in a two-station conveyor-spreader to establish the width of the fabric and to controllably advance or retard the fabric edges relative to the center for cross line control and orientation, steaming the fabric to set its initially oriented geometry, and thereafter maintaining that oriented geometry by feeding the fabric free of tension (particularly "drag" over a spreading frame).

In accordance with more specific aspects of the invention, the tubular knitted fabric is presented to a combined spreader-propeller facility, which spreads the fabric to a flat, two-layer form and advances it by its internal edges throughout most of the process while maintaining the fabric under precisely controlled geometry. After the fabric is initially distended to a predesignated width and its cross lines are straightened and oriented, it is geometrically stabilized by steaming and then conveyed by its edges while being maintained in flat, two-layered form under slight lateral distension (sufficient for positive gripping and control). While being thus conveyed, free of tension and edge drag, the fabric is gummed, usually along its centerline, by the application of a suitable gumming composition. If applied in a vehicle (e.g., water or solvent), the gumming composition is dried; if not (e.g., thermoplastic gumming composition), it is permitted to set or cure. In either case, the fabric is maintained under the continuous control of the flat-spreading and conveying facility throughout the drying or curring stage and, further, throughout a slitting stage which follows. The slit fabric is then conveyed, without interruption of continuity, and free of tension, through opening and gathering (e.g., wind-up) stages, enabling the optimum gathered product to be achieved.

Prior art

Although there has been recognition in the prior art of the need for procedures for gumming, slitting, opening, and gathering of tubular knitted fabrics (e.g., the Shippling United States Patent No. 1,964,691), the prior art approaches have not been directed to the proper ultimate objectives. Consequently, there has been no recognition in the prior art of the significant underlying concepts of the present invention. Thus, merely performing gumming and slitting operations in an accurate and efficient manner is not an appropriate objective. What is required to be delivered to the customer is a gathered body (e.g., a wound-up roll) of slit and opened fabric, properly gummed at the edges and of uniform width from one end to the other within very narrow tolerances.

Because of the highly distortable nature of tubular knitted fabric, and its essentially spiral construction, it is a very difficult material to handle without distortion. Moreover, because of the distortable nature of the fabric and the substantial interdependence of its length and width dimensions, even slight variations in processing can introduce significant geometric changes in the fabric. In a slitting and opening process, such variations manifest themselves in width variations in the rolled-up, open-width fabric, which can make the material unsuitable for sale because the customer typically has definte width requirements for the finished material. Further, if the fabric is drawn over a spreader frame under tension, there is specific drag on the fabric where it engages the frame. This introduces localized tensions and results in crooked cross lines, which would render the fabric unsuitable for many end uses.

In the present invention, we have recognized the need for first geometrically orienting the fabric and then stabilizing it. Thereafter, the fabric is maintained under positive control, in spread-flat condition, free of tension and drag, through the gumming and slitting operations. In conjunction therewith, opening and gathering of the fabric is effected without interruption of process continuity. The prior art proposals of which we are aware are in all cases characterized by tension and drag on the fabric and by discontinuities, either in fabric control or in processing sequences, and frequently both. This introduces undesirable width variation and cross line irregularity in the finished product and makes it less suitable, or possibly unsuitable, for its intended use.

For a better understanding of the above and other aspects of the invention, reference should be made to the following detailed specification and to the accompanying drawing.

Description of the drawing

FIG. 1 is a top plan view, with parts broken away, of a combined, unitary installation, according to the invention, for gumming, slitting, opening, and gathering knitted fabric, in the conversion thereof from tubular to open-width form, in a continuous and sustained sqeuence of operations.

FIG. 2 is a side elevation of the installation of FIG. 1.

FIGS. 3a and 3b are simplified plan views of the installation of FIG. 1 illustrating particularly the drive system employed in the operation of the equipment.

FIGS. 4 and 5 are cross-sectional views taken along lines 4—4 and 5—5, respectively, of FIG. 3b.

FIGS. 6a and 6b are top plan views of a specifically novel and improved internal conveyor for carrying tubular knitted fabric through a plurality of related operating stages while maintaining the fabric in a uniform condition.

FIGS. 7 and 8 are enlarged, fragmentary, cross-sectional views taken generally along lines 7—7 and 8—8, respectively, of FIG. 6a.

FIG. 9 is a fragmentary, cross-sectional view taken along line 9—9 of FIG. 7 (or of FIG. 6a).

FIG. 10 is an enlarged view, partly in cross-section, of a facility incorporated in the apparatus of the invention for applying a predetermined strip of gumming composition to a travelling web of knitted material.

FIG. 11 is a cross-sectional view taken generally along line 11—11 of FIG. 10.

FIG. 12 is a cross-sectional view taken generally along line 12—12 of FIG. 11.

FIG. 13 is an enlarged, fragmentary, cross-sectional view taken generally along line 13—13 of FIG. 12.

FIG. 14 is a fragmentary, cross-sectional view taken along line 14—14 of FIG. 13.

Description of a preferred embodiment

Referring now to the drawing, and initially to FIGS. 1 and 2 thereof, an installation according to the broader concepts of the invention comprises a supply stage for delivering tubular knitted fabric to be processed; an elongated conveying stage for conveying the supplied tubular fabric under positive control and in predetermined condition, during which stage the fabric is calendered, gummed, dried or cured, and slit in a continuous, sustained sequence; an opening stage, in which the slit fabric is manipulated from tubular to open width form; and a gathering stage, in which the open width fabric is gathered in the form of a roll, or, if desired, in the form of a series of back-and-forth folds. The elongated conveying stage logically is divided into a plurality of substages, including, in sequence, a calendering stage, in which the supplied fabric is laterally distended to predetermined width in flat form, geometrically oriented, and then steamed; a gumming stage, in which a predetermined strip of gumming composition is applied to one surface of the longitudinally advancing fabric; a drying stage, in which the applied gumming composition is dried or cured; and a slitting stage, in which the fabric tube is slit longitudinally along the strip of cured gumming composition. One of the significant broader aspects of the invention resides in the performance of the calendering and orienting, gumming, drying or curing, and slitting operations while the fabric tube is in sustained, controlled motion on an integrated conveying facility, such that in all stages the fabric is subject to highly accurate continuous geometric control, of an order heretofore unattainable, assuring the highest uniformity in the finished products and enabling the highest practicable accuracy in the edge registration of the gathered, "finished" fabric at the discharge end of the machine.

In the illustrated system, a supply container 20 is arranged to discharge a continuous web 21 of tubular knitted fabric over an idler bar 22, over and around a pair of smoothing bars 23, 24, under and around a dancer roll 25, and over a guide roll 26 mounted at the entry end of the machine frame. The arrangement of the various guide bars 22–24 and dancer roll 25 is such as to provide a steady supply of the raw tubular knitted fabric 21 under a relatively even tension. After passing over the entry end roller 26, the fabric 21 passes through a smoothing and tensioning station 27, advantageously consisting of three bars or rollers arranged in parallel relation with a triangular axis configuration. This smooths out the incoming tubular material and imparts a substantially uniform (although small) tension to the fabric, in a lengthwise direction.

After passing through the tension bar assembly 27, the fabric advances over the diverging, entry end section of a spreader and conveyor system, the spreader section being designated by the numeral 28 and consisting of a pair of divergently related belts 29 driven externally, as will be described in greater detail, by edge drive rollers 30. In being advanced by the belt 29, the fabric tube is distended laterally to a predetermined width and is advanced at a predetermined speed. At the edge roll station, the distended fabric is transferred to a second set of belts 31, advantageously traveling at a slightly lower speed, such that the distended fabric is transferred to the belts in a longitudinally relaxed condition, all while being maintained under complete and continuous control as to dimensions and speeds and fabric geometry. The distended fabric, now being conveyed by the belts 31, is passed through opposed steamers 32, by which the fabric is thoroughly penetrated by steam, to relieve various yarn and stitch tensions in accordance with known theories, to stabilize the knit fabric tube in its uniformly distended condition. Thereafter, the calendered and geometrically stabilized fabric tube is conveyed by the belts 31 throughout an elongated conveying stage and while being maintained under constant control and in a uniform condition, while a plurality of processing steps are carried out, up to and including the step of slitting the fabric tube.

As indicated in FIGS. 1 and 2, the stabilized fabric 21, after passing the steamers 32, is engaged on its upper surface by an applicator, generally indicated by the reference numeral 33 which applies a predetermined strip of gumming composition along the longitudinally advancing fabric tube, advantageously along the center of the fabric.

After being exposed to the gumming applicator 33, which applies a strip of, say, one inch width to the fabric, the fabric is conveyed through the dryer section generally designated by the numeral 34, which includes a specifically novel dryer system arranged to direct a longitudinally extending stream of drying air vertically downward onto the freshly applied gummed strip, the arrangement further being such that the downwardly directed stream of drying air is diverted and redirected upwardly, collected and recirculated for extremely high drying efficiency. As will be understood, the drying facility may be omitted if self-curing gumming compositions are utilized, such as suitable hot melt gumming compositions.

After the drying sequence, and while the fabric tube is still being conveyed under conditions of positive and uniform fabric control, the fabric is passed under a slitting station generally designated by the numeral 35, which is arranged to slit the fabric tube centrally along the now dried or cured strip of gumming composition. Thereafter, in accordance with the invention, the slit fabric tube continues to be conveyed forward for a predetermined distance, being passed shortly through an isolating roll stage, generally designated by the numeral 36.

The slit fabric emerging from the isolating roll section 36 is manipulated in an advantageous manner and while maintaining complete fabric control such that the fabric tube is fully opened and arranged in flat, open width condition, this operation being carried out in an opening frame designated generally by the reference numeral 37. Thereafter, the flat, open width fabric, while still under control, is passed directly into a gathering stage designated generally by the reference numeral 38. In this specifically illustrated arrangement, the gathering stage consists of facilities for gathering the open width fabric in roll form. However, it will be understood that suitable means of a specifically conventional type may be provided for gathering the open width fabric in flat, folded condition.

Thus, it will be observed that, from the time the fabric tube initially is engaged by the distending belts 29, until the time it is gathered at the discharge end of the machine, the fabric is kept under sustained positive control as to dimensions and geometric conditions, such that the necessary sequence of processing steps can be carried out in an interrelated, sustained series, providing, as a "finished" product, a flat, uniformly conditioned, open width material in gathered form which is of highly uniform width throughout. The operations of spreading the fabric and setting it to uniform, predetermined width, being followed in integral sequence by the gumming, curing, slitting and opening operations, may be carried out without the use of calendering rollers. This is particularly advantageous in that "edge" creases in the fabric, which are very undesirable in the open width fabric, are minimized to the greatest practicable extent.

One of the important, specific structural features of the invention resides in the provision of a novel, elongated structure for conveying and controlling the fabric throughout a sustained, continuous series of operations, the structure being illustrated particularly in FIGS. 6a and 6b. Advantageously, the conveyor structure comprises a central, elongated truss or bridge 40, typically consisting of four tubular elements 41 arranged in rectangular configuration and extending longitudinally substantially throughout the length of the conveyor apparatus. The structural elements 41 are clamped in a rectangular configuration by special clamping brackets 42–45 positioned at various longitudinally spaced points along the truss structure, the arrangement being such that a unitary, rigid, lightweight structure is afforded. In the specifically illustrated form of the invention, the upper pair of structural elements 41 terminates at the entry-side bracket 45, while the lower pair of elements extends further, terminating in a journal bracket 46, as shown in FIG. 6b.

Extended outward from each of the brackets 42–46 is a pair of tubular supports, the series of supports being identified by the reference numerals 47–50. Adjustable supporting rods 47a–50a extend outward from each set of tubular supports and engage opposed, elongated tracking rails 51, 52. The tracking rails, which are symmetrically related to the truss structure 40, are adjustable simultaneously inward or outward, for controlled adjustment of the conveyor width and, to this end, the tubular supports 47, 49, and the rods 47a, 49a extending therefrom are appropriately threaded, and the tubular supports 47, 49 are supported in their respective brackets 42, 44 for rotation in either direction. Thus, upon controlled rotation of the supports 47, 49, the tracking rails 51, 52 can be adjusted inward or outward, the rods 48a, 50a advantageous sliding freely within their respective tubular supports 48, 50.

Convenient manual adjustment of the tracking frames is provided by means of an arrangement, shown particularly in FIGS. 8 and 9, comprising a bracket 53 secured to the machine frame and having a depending section 54 extending downward substantially through the tubular support 47 where it engages the clamping bracket 42. At a convenient, accessible height, the bracket arm 54 mounts a bearing 55 supporting a shaft 56 having a hand wheel 57 at one end and a sprocket 58 at the other. A chain 59 is trained around the sprocket and extends downward and is trained around a second sprocket 60 keyed to the tubular support 47. Thus, by manipulation of the hand wheel 57, the tubular support 47 can be rotated in either direction. The threaded rods 47a, being held non-rotatable by the tracking rails 51, 52, are thereby caused to either advance or retract, depending upon the direction of rotation of the tubular support.

For simultaneous and equal adjustment of the tracking rails at both ends, advantageous facilities are provided for synchronizing the rotation of the threaded tubular supports 47, 49. Specifically, the tubular support 47 is provided with a keyed sprocket 61, which is received within cut-away portions of the clamping bracket 42 and an upper and lower pair (lefthand side in FIG. 9) of tubular elements 41 making up the central truss structure.

The diameter of the sprocket 61 is such that the teeth thereof extend into the center regions of the respective upper and lower tubular elements, such that a chain 62 may be trained around the sprocket 61, with horizontal reaches of the chain 62 extending longitudinally through the interiors of the tubular truss elements. The chain 62, driven in accordance with rotation of the tubular support 47, is trained at its entry-side extremity about a sprocket 63 (FIG. 7) keyed to the tubular shaft 49. The sprocket 63, as in the case of the sprocket 61, is received within appropriate cut-out sections of the tubular elements 41 and the clamping bracket 44, such that the teeth of the sprocket project into center regions of the tubular elements, allowing the chains to be extended throughout a substantial length of the conveyor assembly while being wholly protected within the interior of the tubular structural elements 41.

The conveyor assembly is supported in operative association with the other components of the system in such manner that thin tongue sections 64, at the exit-side ends of the tracking rails, are arranged to be received at or within the nip formed by isolation rollers 65, 66. Adjacent the entry-side end of the conveyor, there is provided a carrier roller assembly 67, which is journaled on or about the axis of the tubular support 50 and is arranged to be supported over and by a support roller 68 mounted on the machine frame. Advantageously, substantially the entire weight of the conveyor assembly is borne by the tongues 64, at the exit end, and the carrier rollers 67, at the entry side, with the central truss structure 40 providing structural support in between.

Advantageously, a shield 69 is positioned over the top of the carrier roller assembly 67 so that tubular fabric passing over the conveyor structure will not be engaged and abraded by the upper surfaces of the roller.

In accordance with one aspect of the invention, the tracking rails 51, 52 are straight and parallel throughout their effective lengths, extending from pulleys 70 at the exit end to pulleys 71 at the entry end, the pulleys 71 advantageously being substantially in advance of the carrier rollers 67. Cooperating with the straight, parallel section of the conveyor structure is an opening or distending section, consisting of the belts 29, supported by a plurality of pulleys, mounted in frame sections 72, 73. A first pair of pulleys 74 is arranged for cooperation with the pulleys 71, as illustrated specifically in FIG. 6b, while pulleys 75, at the opposite, entry side extremity of the belts 29 are located somewhat inward, so that the belts 29 travel an inward-to-outward course in an advancing direction, simultaneously to advance and laterally distend the tubular fabric as it is received from the tension bar straightener assembly 27.

As indicated in FIGS. 1 and 3b, adjacent cooperating sets of pulleys 71, 74 are arranged to be engaged in the working apparatus by a pair of edge drive rolls 30, which are adjustable inward and outward and are driven at a controlled speed, as will be more fully described. The edge rolls 30 are arranged to be received within the recess formed between the sets of pulleys 71, 74, so that the edge drive rolls serve in one capacity to position the entire conveyor frame structure longitudinally, although little, if any, weight is supported by the edge drive rolls. Advantageously, the edge drive rolls 30, provided with a suitable resilient outer surface, have driving engagement with the exit side pulleys 74 for the distending belts 29. Accordingly, the speed of the distending belts is determined and controlled by the edge drive roll 30.

In a typical two-stage spreader propeller arrangement of known design, the edge drive rolls drive sets of entry-side and exit-side belts at related (although usually different) speeds. However, as one of the specific aspects of the present invention, the edge drive rolls 30 do not drive the elongated belts 31 of the conveyor section. This is enabled by forming the pulleys 71 of multi-part construction, substantially as shown in FIG. 5. Thus, upper and lower sections 76, 77 of the pulleys 71 project radially outward into engagement with driving surfaces of the edge drive roll 30, while central, belt supporting sections 78 of the pulleys engage and support the belts 31 and are arranged to be maintained out of contact with the edge drive roll and fully and independently rotatable relative to the driven parts 76, 77 of the pulley. Thus, while the pulley sets 71, 74 cooperate with the edge drive rolls 30 for longitudinal positioning of the entire conveyor frame structure and for maintaining pressure engagement between the drive rolls and the pulleys 74, the forward conveyor belts 31 themselves remain completely independent of the edge drive rolls. The independent relationship between the elongated, forward belts 31 and the edge drive rolls 30 constitutes a specific, advantageous feature of the invention, in view of the very substantial length of the belts 31 (e.g., 36–38 feet, to provide a forward-going reach of about 17 feet for installations involving water-based gumming compositions).

Referring specifically to FIGS. 6a and 6b, the elongated belts 31 are shown to have outer reaches extending between the pulleys 70, 71 and received in outwardly facing grooves 78 in the tracking frames 51, 52. At the discharge end of the frame, the belts 31 pass around the pulleys 70 and extend inward around pulleys 79a, 79b secured at the lower end of a drive input shaft assembly 80. The pulleys 79a, 79b are located generally within the physical outlines of the conveyor structure, so that the advancing fabric tube has portions passing above and below the pulleys. Advantageously, the lower end of the drive shaft assembly 80 is supported immediately above the pulleys by a bracket 81 extending from the clamping assembly 42, as illustrated in FIG. 8.

After passing around the drive pulley 79a, 79b, the belts 31 pass around a series of guide pulleys 82–84 and takeup or tension pulleys 85, the latter being secured on lever arms 86 acted upon by adjustable tensioning springs 87.

As shown more particularly in FIG. 8, the shaft assembly 80 actually comprises a tubular outer shaft 88 and a central quill shaft 89, with the tubular outer shaft 88 mounting an upper pulley 79a and the quill shaft 89 mounting a lower pulley 79b. By a suitable gear box mechanism 90 (FIG. 3a), which is wholly conventional in principle and therefore not illustrated in detail, the shafts 88, 89 are arranged to be driven in opposite directions but at corresponding speeds, such that both of the belts 31 travel at the same linear speed, with the outer or exposed reaches of each belt traveling in the forward direction. Typically, the shafts 88, 89 mount sprockets 91, 92 respectively at their upper ends, the sprockets being driven in turn by chains 93, 94 connected with the gear box 90.

One of the substantial advantages realized by driving the belts 31 from the forward end of the conveyor frame, rather than in a conventional manner by the edge drive rolls 30, is that the outer or forward-going reaches of the belts 31 are maintained under direct tension from the drive pulleys 79a, 79b. Accordingly, without placing the entire belt system under extreme tensions, the desired parts (i.e., the outer reaches) of the belts are kept under a desired tension, keeping the outer reaches straight and flat and properly tracked in the grooves of the rails 51, 52.

Advantageously, the conveyor frame also supports, adjacent its entry end, a small back-up roller 100 (FIG. 10) which forms part of the gum applicator 33 and is arranged to be received within the advancing fabric tube with its upper surface engaging the bottom of the upper fabric layer. The back-up roller 100 advantageously is journaled in a cup-like support 101, which is removably mounted on a pin 102 carried by the truss structure 40 of the conveyor frame. The cup-like support 101 extends underneath the back-up wheel 100, to keep the lower fabric layer out of contact with the back-up wheel and the support also serves as a receptable to contain any drippings of gumming composition, which might pass through the fabric and be carried around by the back-up wheel.

Mounted directly above the back-up wheel 100 is an applicator wheel 103, which is journaled in a frame 104, the frame 104 being in turn pivotally connected at 105 to a bracket 106 forming a fixed part of the machine structure. A control arm 107 extends from the frame 104 and engages a manual control element 108 which threadedly engages a rod 109 supported in the bracket 106. By appropriate manipulation of the control element 108, the frame 104 can be pivoted upward or downward, so that the applicator wheel 103 is brought to bear with a controlled amount of pressure upon the back-up wheel 100.

Cooperating with the applicator wheel 103 is a transfer wheel 110 which is supported by a slide block 111, in the frame 104. The slide block is threadedly engaged by a control member 112, so that the transfer wheel 110 may be moved toward or away from the applicator wheel 103 to be brought to bear upon the applicator wheel with a predetermined, adjustable pressure. Advantageously, both the transfer wheel 110 and the applicator wheel 103 are removably mounted on shafts 113, 114 (FIG. 11) and are secured thereon by hand nuts 115, 116, the arrangement being such that the wheels 103, 110 can be removed quickly and conveniently, for periodic cleaning.

Gumming composition is supplied to the transfer wheel 110 by a reservoir pan 117, which is removably and adjustably secured to the frame 104 by slotted-head bolts 118, 119 engaged by wing nuts 120, 121. As shown particularly in FIG. 10, the slotted head bolts 118, 119 are received in keyhold-shaped openings 122, 123 in the side wall 124 of the reservoir pan, the narrow portions of the keyhold openings being elongated to accommodate sliding movement of the reservoir pan 117 toward and away from the applicator roll 123. Advantageously, the front portion of the reservoir pan 117 is notched out to provide a pair of side scraping edges 125, 126 and a doctoring edge 127 (FIG. 11).

The reservoir pan 117 is supplied with gumming composition to a predetermined level above the bottom extremity of the transfer wheel 110 but below the edge 127 of the pan. Accordingly, as the upper layer of the fabric tube is advanced between the applicator wheel 103 and the back-up wheel 100, the applicator wheel 103 is caused to rotate in a clockwise direction, while the transfer wheel 110 is rotated in a counterclockwise direction. In accordance with known principles, the gumming composition is picked up by the transfer wheel and carried around to the pressure nip formed between the transfer wheel and the applicator wheel by appropriate adjustment of the control element 112. A predetermined amount of the composition is metered through the nip and carried away by the surface of the applicator wheel 103, being subsequently applied to the surface of the fabric tube as the fabric passes through the pressure nip formed by the applicator wheel and the backup wheel. The doctor edge 127 typically can be spaced slightly from the surface of the applicator roll 103 remaining substantially inoperative while the metering nip is functioning properly.

As gumming composition is consumed from the reservoir pan 117, make-up is supplied through a tube 103 from a supply container 131 mounted appropriately on the machine frame. The supply container 131 is so arranged, according to known principles, as to supply the gumming composition at a predetermined, constant head, so that the composition is retained at a predetermined level in the reservoir pan 117.

All operative parts of the gumming applicator 33 are designed for easy removal and replacement, such that cleaning of the parts from time to time is facilitated.

As one of the specific aspects of the invention, novel and improved arrangements are provided for drying or curing of the strip of gumming composition applied to the forwardly moving fabric tube by the applicator wheel 103, when the composition is a water-based material. Specifically, provisions are made for directing a downwardly moving stream of hot air toward the fabric, over an elongated section of the moist, gummed strip, and for diverting the downwardly directed air stream and returning it in an upward direction, where it is collected and recycled. One of the particularly advantageous aspects of the new arrangement resides in the fact that the stream of heated air is directed downwardly, through the gummed fabric, and then upwardly, back through the fabric, before the air is collected for recycling. Practical collecting and recycling of the air is rendered particularly efficient and practical by the fact that the air is diverted in an upward direction, since the upwardly diverted air may conveniently be drawn into chamber openings, aided rather than resisted by the natural tendency of the heated air to flow in an upward direction.

Referring specifically to FIGS. 1, 2, and 13, the improved heating system of the invention incorporates an elongated pressure tube 140, which is closed at one end 141 and is totally enclosed, except for its opposite end 142 by an enlarged air chamber 143. The open end 142 of the pressure tube is exposed to a pressure chamber 143d supplied with heated air under pressure by a blower 144. As indicated particularly in FIG. 1, the pressure tube 140 is disposed longitudinally of the fabric tube and is aligned directly over the strip of gumming composition applied by the applicator 33 positioned adjacent the entry-side end of the pressure tube. In a typical working apparatus, the pressure tube 140 may have a length of about 8 feet and a diameter of about 6 inches.

As shown in FIGS. 13 and 14, the pressure tube 140 is provided throughout its effective length with a longitudinal slot 145, which is located in the lowermost section of the tube. The slot 145 may be relatively narrow (e.g., ⅜ inch) and is arranged to issue a vertically directed, longitudinally elongated stream of air downward onto the upper layer of the fabric tube.

As will be understood, since the pressure tube 140 is supplied with heated air only from its forward end 142, there will be a general, rearward flow of air through the tube. Thus, in order to impart the desired, substantially vertically downward direction to the air streams issuing from the elongated slot 145, and to provide a desired uniformity of flow, it is desirable to install appropriate baffle means along the length of the slot. A particularly simplified and advantageous form of such baffle means is a length of conventional drive chain 146, which is placed inside the pressure tube and disposed over the elongated slot 145, being suitably secured in the bridging position indicated in FIG. 13. The pressurized air within the tube flows substantially through the openings between transverse elements of the chain, so that the issuing air streams are substantially vertically directed.

In accordance with the invention, the pressure tube 140 is substantially wholly contained within a housing 143, which is disposed over the top of the conveyor structure and communicates, through a heater 147 disposed at one side of the housing, with the intake of the blower 144, as indicated by the arrows shown in broken lines in FIG. 1. The bottom wall 148 of the chamber 143 is provided with an elongated, longitudinal opening 149 directly below and extending throughout the entire effective length of the pressure tube 140, forming intake or return openings 150, 151 along opposite side areas of the pressure tube and accommodating downward issuance of the heated air stream through the slot 145 in the pressure tube.

As shown particularly in FIG. 13, a deflecting pan 152 is supported by the spaced upper tubular elements of the conveyor frame structure 40, being disposed directly underneath the discharge slot 145 of the pressure tube and extending along the entire length of the slot. The central section of the deflecting pan is of U-shaped configuration, while the outer sections are in the form of outwardly extending flanges adapted to be disposed over and supported on the tubular elements of the frame structure 40.

The deflecting pan 152 serves two important functions in the apparatus of the invention. A first important function is to divert and direct upwardly the streams of hot air issuing through the elongated slot 145 in the pressure tube. Thus, the heated air passes directly downward and through the upper layer of the fabric tube, as indicated in FIG. 13. Thereupon, the air streams are diverted and deflected upward and slightly outward by the pan 152, so that the air passes upwardly, back through the upper fabric layer, on opposite sides of the principal, downwardly directed air stream. The upwardly diverted, returning air streams are then drawn with great efficiency into the intake openings 150, 151 formed between the housing wall 148 and the exterior of the pressure tube 140. In this respect, it will be understood that the heated air has a natural tendency to rise, which supplements the tendency of the heated air to be drawn into the chamber 143.

Advantageously, the opening 150, which is on the side of the pressure tube toward the blower intake, is somewhat smaller than the opening 151, on the opposite side of the pressure tube. This compensates for the otherwise normal tendency for the air flow to favor the return opening 150, and tends to assure an symmetrical and uniform deflection of the air streams and an equally divided flow through the openings 150, 151. That portion of the air which enters through the opening 151 circulates upward and around the pressure tube 140 and is drawn to the left as viewed in FIG. 13 over the top of the pressure tube and toward the heater 147 and blower 144.

The illustrated dryer arrangement is characterized by extremely high efficiency in operation as well as general compactness in physical form. Of substantial significance, the efficient operation of the drying or curing system is realized by directing an elongated stream of hot air in a vertically downward direction and then upwardly diverting and collecting the air stream for recirculation. The arrangement of the invention not only provides for particularly efficient flow of the drying air through the fabric, for most effective drying or curing action, but also results in a practical minimum of losses of the heated air, so that the cost of operating the equipment is minimized, and the required capacity of the heating unit 147 may be reduced significantly from that required in a conventional system of corresponding drying or curing ability.

Advantageously, the deflecting pan 152 is so designed that its central, U-shaped deflecting portion forms a receptacle so that any amounts of the gumming composition which are blown through the fabric by the downwardly directed air stream are caught and collected by the deflecting pan. From time to time, the deflecting pan, which is simply rested upon the tubular elements of the frame structure 40, is removed and cleaned of the collected composition.

As will be readily understood, where the gumming composition is a material such as a thermoplastic "hot melt" material, the drying system may be deactivated during operation of the system, or dispensed with altogether. When using a self-setting or self-curing gumming composition, such as a hot melt material, it may be sufficient merely to provide for an adequate period of travel of the gummed fabric, prior to slitting. This may be a rather short distance, with at least some hot melt materials.

Following the application of gumming composition and the drying or curing thereof, the fabric tube is slit through its upper layer, centrally along the cured strip of gumming composition. To this end, a slitting knife 150a (FIG. 8) is positioned generally over the fabric 21 and, in accordance with the invention, a short distance in advance of the drive input shafts 88, 89 for the conveying belts 31. The knife 150a is supported on a shaft 151a received within a supporting tube 152a which carries a suitable cover or guard 153 at its outer end. The elements 150a, 151a, 152a, and 153, forming the essential parts of the slitter 35, are mounted in cantilever fashion from the side of the frame structure, as indicated at 154 in FIG. 1, with a suitable motor 155 (FIG. 3a) being provided to rotate the slitter at a desired speed. Suitable means (not specifically illustrated) advantageously are provided for adjusting the slitting knife laterally, so that it may be aligned in the exact center of the fabric to be conveyed by the belts 31.

In accordance with the invention, the location of the slitting knife 150a is in advance of the drive shaft 88, 89, so that the slit edges of the tube may pass on opposite sides of the shafts, thus accommodating the presence of the drive pulleys 79a, 79b within the interior of the tubular configuration of the fabric.

After slitting, the fabric tube is controllably and tensionlessly opened, without process interruption, and presented in flat, open width form. For this purpose, it is advantageous to employ an apparatus substantially of the type described and claimed in the copending application Serial No. 103,927 of Samuel Cohn et al., filed Apr. 18, 1961, for "Method and Means for Slitting and Opening Tubular Fabrics," now United States Patent No. 3,196,723. While specific reference should be made to that patent for details of the opening structure, a brief description thereof will be made herein for convenience. Thus, the facilities include an opening frame 160 comprising a pair of spaced guides having an initial width substantially equal to that of the unslit tube and over which the slit fabric, while still in tubular form, is conveyed. The initial portion of the opening frame which is closely coupled to, or perhaps even integral with, the main conveying frame, extends sharply downward toward an upwardly inclined conveyor blanket 161. A second portion of the opening frame, disposed directly over the conveyor blanket 161, diverges from the tubular width of the fabric to the open width thereof, as indicated particularly in FIG. 1.

As explained in some detail in the patent, the arrangement of the opening frame is such that, from the commencement of the opening to the completion thereof, all longitudinal portions of the fabric are caused to travel through equal distances, the fabric is maintained in a tension-free condition, and, to the greatest practicable extent, the fabric is maintained under complete and positive control.

In accordance with one of the specific aspects of the invention, isolation rollers 65, 66 are interposed between the opening frame 160 and the main conveying frame, such that the fabric is maintained in the form of a closed tube following the slitting operation and up to the time the fabric actually is applied over the opening frame 160. Advantageously, the isolation rollers 65, 66 are provided with a surface covering of felt or similar material arranged to have substantial ability to grip the fabric without requiring pressure to be applied between the rollers.

The provision of the isolating rollers 65, 66 between the slitting and opening stages of the procedure is of substantial importance in maintaining an accurate control over the fabric edges in the final roll of gathered material. Thus, any tendency for the fabric to become misaligned at the slitting stage usually results in the slit being asymmetrically aligned with respect to the opening frame, resulting in turn in substantial misalignment of the edges in the final roll. In the system of the invention, however, the forces acting upon the fabric during the opening stage are effectively isolated from the fabric being advanced past the slitter by the main conveyor stage, so that the greatest practicable accuracy may be maintained throughout.

Subsequent to the gathering operation, it may be desirable to tenter process the fabric to inspect the fabric for flaws and remove lint, to "batch" the fabric into vary large rolls (e.g., 500 to 1,000 pounds), and to still more accurately register the side edges in the batched rolls. This tenter processing operation is greatly facilitated by the fact that the incoming fabric, having been oriented, stabilized, gummed, slit, and opened in accordance with the invention, is of extremely uniform geometry, accurately aligned and dimensioned.

In accordance with one aspect of the invention, facilities are provided for interrelating the operation of all parts of the system acting upon the fabric, from beginning to end, so that positive and regulatable control of the fabric is provided at all stages. FIGS. 3a, 3b, and 4 illustrate an advantageous form of integrated drive system operated from a primary drive motor 170 acting through a controllable, variable speed drive unit 171 and through belts 172, 173 to drive a pulley 174. A pulley 174 drives a shaft having, as one output element, a controllable, variable speed pulley 175 which, through a belt 176 and chain 177, drives a roller 178 about which the conveyor blanket 161 is trained. Thus, the speed of the belt 161 may be varied relative to the "machine speed" established by the pulley 174.

A second output connected to the pulley 174 comprises a pair of chains 179, 180, which drive a shaft 181 connected to the lower isolating roll 66. The upper isolating roll 65 is driven at an identical speed but in the opposite rotary direction by means of gears 182, 183. The isolating rollers 65, 66, being driven directly from the pulley 174, travel at the "machine speed" (which, it will be understood, is variable by variation of the drive pulley 171).

Connected directly to the isolation roller 66, through a shaft 184, is the gear box 90, which drives the chains 93, 94 in fixed relationship to the rotation of the isolation rollers, such that the principal conveyor belts 31 are driven at the machine speed.

Also connected to the isolation roller 66, through an elongated chain 185 extending lengthwise of the machine, is an idler shaft 186 (FIG. 3b). At one end, the shaft 186 mounts a sprocket 187 driving a chain 188, which is trained about idler sprockets 189, 190 (FIG. 4) and drives a sprocket 191 connected through a shaft 192 to the applicator wheel 103 of the gumming applicator 33. Thus, the rotation of the applicator wheel 103 is maintained in fixed relation to the machine speed. The shaft 186 also drives the supporting roller 68 through chain 193, directly in accordance with the machine speed.

It will be understood, of course, that the various rollers and wheels acting throughout the system and operating at "machine speed" may have different rotational speeds; however, in each case the peripheral speed of the roller or wheel will be identical and equal to the speed at which the fabric advances through the system.

By means of a belt 194 driven from the shaft 186, a controllable variable pulley 195, and a chain drive 196, the edge drive rolls 30 may be driven at a speed which is related to but may be varied from the machine speed. Advantageously, the speed of the edge drive rolls is adjusted to drive the belts 29 at a speed slightly higher than the speed of the belts 31, so that the fabric tube advanced onto the main conveyor belts 31 is completely relaxed in a longitudinal direction.

The roller 26, over which the fabric passes at the entry end of the machine, after passing around a dancer roll 25, is driven in accordance with the speed of the distending belts 29, by a system including a drive chain 197, belts 198, 199, and a pulley 200.

Thus, in setting up the machine for sustained operation, the "machine speed" is set by regulation of the variable speed pulley 171, which sets the operating speeds for the isolation rollers 65, 66, the main conveyor belts 31, the gum applicator wheel 103, and the supporting roller 68. The advancement of the fabric over the distending belts 29 is regulated by the variable pulley 195 advantageously to a level slightly above the "machine speed" such that the fabric is slightly overfed onto the main conveyor belts 31. At the opposite or discharge end of the machine, the speed of operation of the conveyor blanket 161 is regulated by the variable pulley 175. The latter adjustment normally sets the speed of the conveyor blanket to be very nearly identical to the machine speed, the exact setting being made according to the operator's experienced judgment upon observation of the specific material being processed, as it passes through the opening stages of the system.

Summary of operation

Summarzing the operation of the equipment, the unprocessed tubular fabric is first drawn from the supply container 20 and is drawn over the driven roller 26 at the entry end of the machine. The fabric then travels through the bar straightener 27 and is advanced onto a pair of divergently related distending belts 29, which serve to distend the fabric tube outward, to predetermined width, while advancing the fabric tube at a predetermined speed adjusted advantegeously to be somewhat above the normal machine speed. By controllably varying the speed of the entry-end belts 29 relative to that of the exit-end belts the fabric may be geometrically oriented in a desired manner, to straighten the cross lines of the fabric and to eliminate lengthwise tension.

The geometrically oriented fabric is then advanced by the principal conveyor belts 31, which engage the fabric internally at its edges and convey the fabric throughout a substantial distance while maintaining the dimensions and geometric conditions of the fabric substantially uniform. Initially, the fabric being carried by the belts 31 is subjected to steaming, which permits the stitches and fibers of the fabric to adjust and substantially "sets" the fabric in its uniformly flattened and distended condition. The thus geometrically stabilized fabric thereafter is conveyed successively through a gumming stage, a drying or curing stage, and a slitting stage, all while being maintained in continuous, sustained motion, free of tension and drag and under complete geometric control by the forwardly moving belts 31.

In the gumming stage, a narrow, predetermined strip of gumming composition is applied to the upper layer of the fabric, advantageously exactly along the centerline of the fabric tube. Thereafter, if the composition is water-based, the gummed fabric travels along and underneath a drying chamber which, as indicated in FIG. 13 in particular, is arranged to issue a longitudinally elongated stream of heated air vertically downward at and through the gummed area of the fabric upper layer. The downwardly directed air stream is then divided and diverted upwardly, being recaptured and recirculated in a highly efficient and effective manner by the arrangement of the invention.

After drying or curing, the fabric, while still in flat form and under positive geometric control, advances past a slitting station 35, in which a slitting knife 150a severs the gummed upper layer of the fabric tube, advantageously along the center of the gummed strip. The fabric, even though slit, continues to advance a short distance while being retained in tubular form, until passing through a pair of isolation rollers 65, 66. Thereafter, the fabric passes onto an opening frame 160 of a character discussed in more detail in the before-mentioned Patent No. 3,196,723, the slit fabric tube being then progressively opened in a controlled an tension-free manner and presented for gathering. In the specific, illustrated apparatus, the open width material is gathered in the form of a roll, although it will be understood that suitable conventional folding apparatus may be employed, an advantageous form of such folding apparatus being illustrated in the patent.

Significantly, the system of the invention maintains the fabric under positive and continuous geometric control while performing a sustained series of operations upon the fabric, enabling it to be finally presented in gathered form with highly uniform registration of the side edges. Substantial advantages are realized from such sustained operations, in the nature of more uniform open fabric, less waste and soilage, freedom from rolled-in edge creases in the open fabric and, of course, the more obvious but nonetheless significant savings in labor and plant space.

One of the significant features of the invention resides in the provision of an elongated, front-driven internal conveyor, enabling the fabric to be maintained in sustained motion and under continuous geometric control, free of tension and drag, through a sequence of operations including steaming, gumming, drying or curing, and slitting. Similarly, the improved and highly efficient drying system incorporated in the apparatus of the invention enables drying or curing of a water-based gumming composition to be accomplished with great efficiency and within practical lengthwise limits of a fabric tube traveling at reasonable speeds. This greatly facilitates the incorporation in a single line, of gumming and slitting operations, which necessarily are arranged to precede and follow the drying or curing operation.

One of the important overall aspects of the invention resides in the fact that it is directed essentially to the production of gathered, open-width knitted fabric of uniform geometry, including straight cross lines, even width and accurate edge registration. To this end, the invention is directed to the concept of initially geometrically orienting the tubular fabric by bringing it into laterally distended, flat form, free of tension and with straight cross lines, then geometrically stabilizing the fabric by steaming, and thereafter gumming, curing, and slitting the fabric while maintaining it under positive geometric control. The slit fabric is thereafter opened and gathered without loss of fabric control or process continuity.

It will be understood that the specific form of the invention illustrated and described herein is intended to be representative only and that certain changes may be made therein without departing from the clear teachings of the disclosure. Accordingly, reference should be made to the following appended claims in determining the full scope of the invention.

What is claimed is:

1. A continuous process for converting tubular knitted fabric to open-width form, which comprises:
   (a) initially presenting the fabric in tubular form,
   (b) engaging the presented fabric by opposed internal edges, with spaced parallel driven belts,
   (c) laterally distending the fabric to flat two layer form and to predetermined uniform width to establish predetermined conditions of fabric geometry,
   (d) steaming the distended fabric to stabilize its geometry,
   (e) applying a gumming composition to a predetermined longitudinal area of the advancing stabilized fabric,
   (f) causing the gumming composition to set while continuing to advance the fabric,
   (g) slitting the gummed fabric longitudinally along the area of the set gum,
   (h) advancing the fabric throughout the period including said steaming, gumming and setting operations and up to the slitting operation by maintaining continuous extended engagement with both of the opposed internal fabric edges by said belts, and driving the belts,
   (i) maintaining the fabric in said flat two layer form and controllably restraining the fabric against widthwise contraction continuously throughout the extended engagement and conveying of its edges,
   (j) while maintaining the fabric uninterruptedly in an advancing motion, opening the slit fabric tubes and gathering the resulting open-width fabric with its slit edges in substantial registration.

2. The continuous process of claim 1, in which
   (a) heat is applied to the gumming composition to cause it to set.

3. The continuous process of claim 1, in which
   (a) the slit fabric is movably gripped across its width between the slitting step and the opening and gathering step in a manner to isolate the unopened fabric from the forces and tensions affecting the fabric during opening and gathering.

4. A continuous process for converting tubular knitted fabric to open-width form, which comprises
   (a) initially presenting the fabric in tubular form,
   (b) engaging the presented fabric internally and distending it outwardly to predetermined dimensions and to a flat two layer cross-sectional configuration, by means of spaced parallel driven belts,
   (c) steaming the thus distended fabric to stabilize its geometry,
   (d) applying a gumming composition to a predetermined longitudinal area of the advancing stabilized fabric,
   (e) causing the gumming composition to set while continuing to advance the fabric,
   (f) slitting the gummed fabric longitudinally along the area of the set gum,
   (g) advancing the fabric throughout the period including said steaming, gumming and setting operations and up to the slitting operation by maintaining continuous extended engagement with internal edge portions of the fabric by said belts and conveying the engaged edge portions of the fabric by driving said belts,
   (h) maintaining the fabric in said flat cross-sectional configuration and restraining the fabric against widthwise contraction continuously throughout the extended engagement and conveying of said edge portions, and
   (i) while maintaining the fabric uninterruptedly in an advancing motion, opening the slit fabric tube and gathering the resulting open-width fabric with its slit edges in substantial registration.

5. A continuous process according to claim 4, in which
   (a) the fabric is gripped across its full width immediately subsequent to the slitting step and prior to opening in a manner to isolate the unopened fabric from the forces and tensions affecting the fabric during opening.

6. A continuous process according to claim 4, in which
   (a) the open-width fabric is gathered in the form of a wound-up roll.

7. The method of processing tubular knitted fabric which comprises
   (a) engaging the fabric at its edges and spreading the fabric laterally to flat tubular form and advancing the flat tube in a plane,
   (b) applying a gumming composition to a predetermined, relatively narrow longitudinal area of one layer of the fabric tube,
   (c) immediately thereafter and as part of a continuous procedure drying said gumming composition by directing a longitudinally elongated, relatively narrow stream of heated drying air generally at right angles to said one layer of fabric onto and in the immediate region of the applied strip of said composition and through said one layer of fabric,
   (d) deflecting the air stream and returning it in an opposite direction back through said one layer of fabric, and
   (e) continuously collecting and recirculating the returned air.

8. The method of claim 7, further characterized by
   (a) said flat tube being advanced in a generally horizontal plane,
   (b) said stream of heated air being directed generally vertically downward through the upper layer of fabric,
   (c) the deflected air stream being returned generally vertically upward.

9. An apparatus for continuously converting tubular knitted fabric to open-width form, comprising
   (a) conveyor means having a first stage for engaging the fabric internally and distending it laterally to predetermined geometrical orientation,
   (b) means for steaming the oriented fabric on said conveyor to geometrically stabilize the fabric,
   (c) said conveyor means having a second stage for conveying the geometrically stabilized fabric,
   (c) said conveyor means having a second stage for conveying the geometrically stabilized fabric substantially free of lengthwise tension and drag,
   (d) separate means mounted in cooperative relation to the second stage of said conveyor means for successively applying a gumming composition, effecting setting thereof, and slitting the fabric longitudinally along the linear area of the gumming composition,
   (e) means disposed at the discharge end of the conveyor means for engaging the slit fabric tube substantially across its full width, and
   (f) means at the discharge side of said last-mentioned engaging means for opening to flat, open-width form and gathering the fabric with its slit edges in substantial registration.

10. The apparatus of claim 9, further characterized by
    (a) said conveying means comprising a pair of spaced, generally parallel belts adapted to engage the fabric at opposed internal edges and convey it in flat cross-sectional configuration.

11. The apparatus of claim 9, further characterized by
    (a) the means for effecting setting of the gumming composition comprising drying means.

12. The apparatus of claim 11, further characterized by the drying means comprising
    (a) a longitudinally disposed hot air duct for directing an elongated longitudinally disposed hot air stream into said gumming composition, and
    (b) an air return duct disposed longitudinally along said fabric, parallel and adjacent to said hot air duct.

13. The apparatus of claim 9, further characterized by said conveyor means comprising
    (a) a pair of divergently related spreader belts for engaging the interior of a knitted fabric tube for advancing the tube in flat form and laterally distending the tube,
    (b) a pair of elongated conveyor belts positioned to receive the fabric tube substantially directly from said spreader belts and to engage the interior of the tube and advance the tube through a predetermined elongated traverse,
    (c) a pair of forward pulleys receiving the spreader belts,
    (d) a pair of rearward pulleys receiving the conveyor belts,
    (e) a pair of edge drive rolls positioned generally intermediate and cooperatively related to the respective said pairs of forward and rearward pulleys,
    (f) said spreader and conveyor belts being supported in part by said edge drive rolls,
    (g) means to drive said spreader belts including said edge drive rolls, and
    (h) means independent of said edge drive rolls and including a pair of exit-end pulleys for driving said conveyor belts.

14. The apparatus of claim 13, in which
    (a) said edge drive rolls drivingly engage said forward and rearward pulleys, at least through an interposed layer of fabric, (b) said rearward pulleys each having a first portion training a conveyor belt and a second and independently rotatable portion engaging an edge drive roll.

15. An apparatus for continuously converting tubular knitted fabric to open-width form, comprising (a) spreader-conveyor means, having first and second stages, for engaging the fabric internally and conveying it by internal wall portions thereof, (b) said first stage being arranged to distend said fabric laterally to predetermined width dimensions, (c) means for controllably adjusting the relative speeds of the first and second conveyor stages to effect controlled geometric orientation of the fabric, (d) means for geometrically stabilizing the oriented fabric by applying steam to the fabric advancing on the second stage of the conveyor, (e) means for gumming and slitting the fabric in succession while it is conveyed by said second stage, (f) opening means at the discharge end of said conveyor for guiding the slit fabric from slit-tubular to open-width form, and (g) gathering means at the discharge end of said opening means for gathering the open-width fabric.

References Cited

UNITED STATES PATENTS 1,964,691   6/1934   Shippling.
2,880,114   3/1959   Cohn et al. _____ 117—7 X ALFRED L. LEAVITT, *Primary Examiner.*

A. M. GRIMALDI, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,059                                                    September 17, 1968

Samuel Cohn, deceased,
by Eugene Cohn and Jean Rothenberg, executors, et al.

It is certified that error appears in the above identified patent and that said Letters Patent are hereby corrected as shown below:

Column 1, line 44, cancel "of knit", second occurrence. Column 3, line 66, "sliting" should read -- slitting --; line 25, "mav" should read -- may --. Column 4, line 9, "curring" should read -- curing --; line 72, "sqeuence" should read -- sequence --. Column 7, line 48, "advantageous" should read -- advantageously --. Column 12, line 29, "an" should read -- a --. Column 14, line 5, "vary" should read -- very --. Column 15, line 24, "advantegeously" should read -- advantageously --. Column 16, line 75, "tubes" should read -- tube --. Column 18, lines 16 and 17, cancel ".(c) said conveyor means having a second stage for conveying the geometrically stabilized fabric,".

Signed and sealed this 31st day of March 1970.

(SEAL)
Attest:

Edward M. Fletcher, Jr.                                     WILLIAM E. SCHUYLER, JR.
Attesting Officer                                                Commissioner of Patents